US011510536B2

(12) United States Patent
Yurko et al.

(10) Patent No.: US 11,510,536 B2
(45) Date of Patent: Nov. 29, 2022

(54) VACUUM FILTER

(71) Applicant: SHOP VAC CORPORATION, Williamsport, PA (US)

(72) Inventors: Michael Z. Yurko, Endicott, NY (US); Neil N. Norell, Candor, NY (US)

(73) Assignee: SHOP VAC CORPORATION, Williamsport, PA (US)

( * ) Notice: Subject to any disclaimer, the term of this patent is extended or adjusted under 35 U.S.C. 154(b) by 865 days.

(21) Appl. No.: 16/226,210

(22) Filed: Dec. 19, 2018

(65) Prior Publication Data

US 2019/0208972 A1     Jul. 11, 2019

Related U.S. Application Data

(60) Provisional application No. 62/613,988, filed on Jan. 5, 2018.

(51) Int. Cl.
*A47L 9/12*     (2006.01)
*B01D 46/52*     (2006.01)
*A47L 7/00*     (2006.01)
*A47L 5/36*     (2006.01)
*B01D 46/24*     (2006.01)
*B60S 1/64*     (2006.01)
(Continued)

(52) U.S. Cl.
CPC .................. *A47L 9/12* (2013.01); *A47L 5/36* (2013.01); *A47L 7/0076* (2013.01); *A47L 9/106* (2013.01); *A47L 9/1409* (2013.01); *A47L 9/1683* (2013.01); *B01D 46/2411* (2013.01); *B01D 46/522* (2013.01); *B60S 1/64* (2013.01); *A47L 9/1691* (2013.01); *B01D 2265/026* (2013.01); *B01D 2275/206* (2013.01); *B01D 2279/55* (2013.01)

(58) Field of Classification Search
CPC . A47L 9/12; A47L 5/36; A47L 7/0076; A47L 9/106; A47L 9/1409; A47L 9/1683; A47L 9/1691
See application file for complete search history.

(56) References Cited

U.S. PATENT DOCUMENTS 5,792,227 A    8/1998   Kahlbaugh et al.
5,871,645 A    2/1999   Reed et al.
(Continued)

FOREIGN PATENT DOCUMENTS

| EP | 0468200 A1 | 1/1992 |
| EP | 2760562 A1 | 8/2014 |
| GB | 2327624 A | 2/1999 |

OTHER PUBLICATIONS

European Patent Application No. EP19150106, European Search Report, dated Jun. 19, 2019.

*Primary Examiner* — Andrew A Horton
(74) *Attorney, Agent, or Firm* — Marshall, Gerstein & Borun LLP

(57) ABSTRACT

A debris canister and filter assembly, which may be used in a vehicular vacuum cleaner, includes a debris canister having an inlet, an outlet, and a peripheral side wall. The peripheral side wall at least partially defines an interior space of the debris canister. A filter is disposed in the interior space of the debris canister, and includes filter media having a non-pleated portion and a pleated portion. The peripheral side wall forms a corner of the debris canister, and the filter media has a rounded-corner shaped to fit adjacent to the corner of the peripheral side wall.

46 Claims, 10 Drawing Sheets

(51) Int. Cl.
*A47L 9/10* (2006.01)
*A47L 9/14* (2006.01)
*A47L 9/16* (2006.01)

(56) References Cited

U.S. PATENT DOCUMENTS

| | | |
|---|---|---|
| 5,871,836 A | 2/1999 | Schultink et al. |
| 6,152,996 A | 11/2000 | Linnersten et al. |
| 6,599,344 B2 | 7/2003 | Tokar et al. |
| 6,702,941 B1 | 3/2004 | Haq et al. |
| 7,413,588 B2 | 8/2008 | Holzmann et al. |
| 7,828,870 B1 | 11/2010 | Rech et al. |
| 7,837,754 B2 | 11/2010 | Johnson et al. |
| 8,092,567 B2 | 1/2012 | Ashwood et al. |
| 8,206,482 B2 | 6/2012 | Williams et al. |
| 8,460,424 B2 | 6/2013 | Rogers et al. |
| 8,486,263 B2 | 7/2013 | Argue et al. |
| 8,518,142 B2 | 8/2013 | Handley et al. |
| 9,039,802 B2 | 5/2015 | Scott et al. |
| 2004/0206238 A1 | 10/2004 | Allgeier |
| 2007/0044442 A1 | 3/2007 | Riedel et al. |
| 2013/0228194 A1 | 9/2013 | Holsten |
| 2014/0109337 A1* | 4/2014 | Krebs .................... A47L 9/127 15/339 |

* cited by examiner

A-A

B-B

C-C

VACUUM FILTER

FIELD OF DISCLOSURE

The present disclosure relates generally to a vacuum filter, and in particular, a compact vacuum filter for a vacuum cleaner.

BACKGROUND

In order to clean a vehicle, such as a car or truck, a vacuum cleaner is often used to vacuum dirt and debris. However, it can be awkward and/or inconvenient to use a typical in-home vacuum cleaner to clean out the interior of a vehicle. To address this inconvenience, attempts have been made to permanently install on-board vehicle vacuum. Such on-board vehicle vacuum cleaners have a compact design to fit within small compartments of the vehicle.

On-board vehicle vacuum cleaners typically include a filter disposed within a collection module to filter air that travels through the vacuum cleaner as air travels through to the motor housing. Conventional filters include either a flat screen covering the inlet to the motor housing, or a bulkier cylindrical filter made of pleated filter media. While the flat screen coverings do not occupy as much space as the pleated cylindrical filters, the flat screen coverings typically have shorter life spans than that of pleated cylindrical filters.

SUMMARY

According to aspects of the present disclosure, a compact filter cartridge for a vacuum cleaner maximizes filtration capacity and minimizes occupied space within a debris canister. The filter cartridge may be positioned against an interior wall of the debris canister, providing more available storage space in the debris canister for debris collection. The filter cartridge is shaped to fit snugly against the interior wall of the debris canister, and in one exemplary embodiment, the filter cartridge is shaped to fit within a corner of the debris canister.

In accordance with a first exemplary aspect, a canister and filter assembly for a vacuum cleaner may include a debris canister having an inlet, an outlet, and a peripheral side wall. The peripheral side wall may at least partially define an interior space of the debris canister. A filter may be disposed in the interior space of the debris canister. The filter may include a filter media having a non-pleated portion and a pleated portion. The peripheral side wall may form a corner, and the filter media may have a corresponding corner shape that may fit adjacent to the corner of the peripheral side wall.

In accordance with a second exemplary aspect, a canister and filter assembly for a vacuum cleaner may include a canister having an inlet, an outlet, and a side wall at least partially defining an interior space. A filter may be disposed in the interior space of the canister. The filter may include a filter media with a first portion that is pleated. An interior layer of material may be disposed adjacent to a second portion of the filter media. The second portion of the filter media may be stretched over the interior layer of material to form a non-pleated portion of filter media.

In accordance with a third exemplary aspect, a filter cartridge for a vacuum cleaner may include a sheet of filter media including a non-pleated portion and a pleated portion. A cavity may be at least partially defined by the filter media. The non-pleated portion may have a first side and a second side that meet to form a corner, the corner having an angle in a range of approximately 45 degrees to approximately 180 degrees between the first side and the second side of the non-pleated portion.

In accordance with a fourth exemplary aspect, a vacuum cleaner may include a vacuum module configured to draw a vacuum. The vacuum module may include a motor disposed in a motor housing. A collector module may be configured to collect debris from air drawn by the vacuum module. The collector module may include a collector housing and a debris canister removably disposed in the collector housing. The debris canister may include an inlet, an outlet, and a peripheral side wall having an interior surface. The interior surface may at least partially define an interior space of the debris canister. A filter cartridge may be disposed in the debris canister, and may include a filter media having a pleated portion and a non-pleated portion. The collector module and the vacuum module may be operatively connected by an interconnecting duct.

In accordance with a fifth exemplary aspect, a filter cartridge for a vacuum cleaner may include a filter forming a closed loop, the closed loop including an outer edge and first end. A cap may be coupled to the first end of the filter and may include an outer perimeter comprising a first corner having a first radius of curvature, a second corner having a second radius of curvature, and a third corner having a third radius of curvature. The second radius of curvature may be substantially equal to the third radius of curvature, and the first radius of curvature may be greater than the second radius of curvature and the third radius of curvature.

In further accordance with any one or more of the foregoing first, second, third, fourth, and fifth aspects, the canister and filter assembly, vacuum cleaner including the canister and filter assembly, and filter cartridge may include any one or more of the following forms.

In some forms, the pleated portion of the filter media may have a first surface area and the non-pleated portion of the filter media may have a second surface area. The first surface area may be greater than the second surface area.

In some forms, an interior layer of material may be disposed adjacent the non-pleated portion of the filter media.

In some forms, the outlet of the debris canister may be disposed adjacent the corner of the peripheral side wall.

In some forms, the non-pleated portion of the filter media may be disposed adjacent to an interior surface of the corner of the peripheral side wall.

In some forms, the filter may be disposed adjacent to the corner of the debris canister. The filter may at least partially surround the outlet.

In some forms, the filter may include a cap coupled to a first end of the filter media and a fitting coupled to a second end of the filter media.

In some forms, the fitting may at least partially surround the outlet when the fitting is coupled to the debris canister.

In some forms, the filter media may include an outer perimeter, and the pleated portion may provide a curve in the outer perimeter.

In some forms, the non-pleated portion of the filter media may be disposed adjacent to an interior surface of the side wall of the canister.

In some forms, the pleated portion of the filter media may have a first thickness and the non-pleated portion of the filter media may have a second thickness. The first thickness may be greater than the second thickness.

In some forms, the side wall of the canister may form a corner and the outlet of the canister may be proximally located to the corner of the canister.

In some forms, the non-pleated portion of the filter media may be adjacent the corner of the canister.

In some forms, the filter media may include a first end and a second end, wherein the second end of the filter media is adjacent to the outlet of the canister.

In some forms, the filter media may include an exterior surface and an interior surface. The non-pleated portion of the exterior surface may face the side wall, and the pleated portion of the exterior surface may face the interior space of the debris canister.

In some forms, the filter may include a cap coupled to the first end of the filter media and a fitting coupled to the second end of the filter media. The fitting may include an aperture.

In some forms, the interior layer may be disposed on an interior side of the non-pleated portion of the filter media. The interior layer may be metal.

In some forms, the interior layer may be plastic.

In some forms, the pleated portion may have a round shape and is connected to the non-pleated portion to form a closed loop.

In some forms, the fitting may include an aperture positioned adjacent to the cavity defined by the filter media.

In some forms, the filter media may include a first end and a second end. The filter cartridge may include a cavity partially defined by the first end and the second end. The cavity of the filter cartridge may be in fluid communication with the interconnecting duct.

In some forms, the filter cartridge may be disposed adjacent to the corner formed by the side wall. The filter cartridge may at least partially surround the outlet of the debris canister.

In some forms, the fitting may be removably coupled to the debris canister. The fitting may at least partially surround the outlet when the fitting is coupled to the debris canister.

In some forms, the cap may extend radially outward from the outer edge of the filter.

In some forms, a second cap may be coupled to a second end of the filter, wherein the second cap includes an outer perimeter substantially aligned with the outer perimeter of the cap.

In some forms, the outer perimeter of the cap may include a fourth corner having a fourth radius of curvature, wherein the fourth radius of curvature is greater than the first radius of curvature.

In some forms, a ratio between the fourth radius of curvature and the first radius of curvature may be approximately 2 to 1.

In some forms, the filter may include a pleated portion extending along the outer edge of the filter between the second corner and the fourth corner of the cap and between the fourth corner and the third corner of the cap.

In some forms, filter may include a non-pleated portion extending along the outer edge of the filter between the first corner and the second corner of the cap.

Any one or more of these aspects may be considered separately and/or combined with each other in any functionally appropriate manner. In addition, any one or more of these aspects may further include and/or be implemented in any one or more of the optional exemplary arrangements and/or features described hereinafter. These and other aspects, arrangements, features, and/or technical effects will become apparent upon detailed inspection of the figures and the following description.

DETAILED DESCRIPTION

Figure 1:
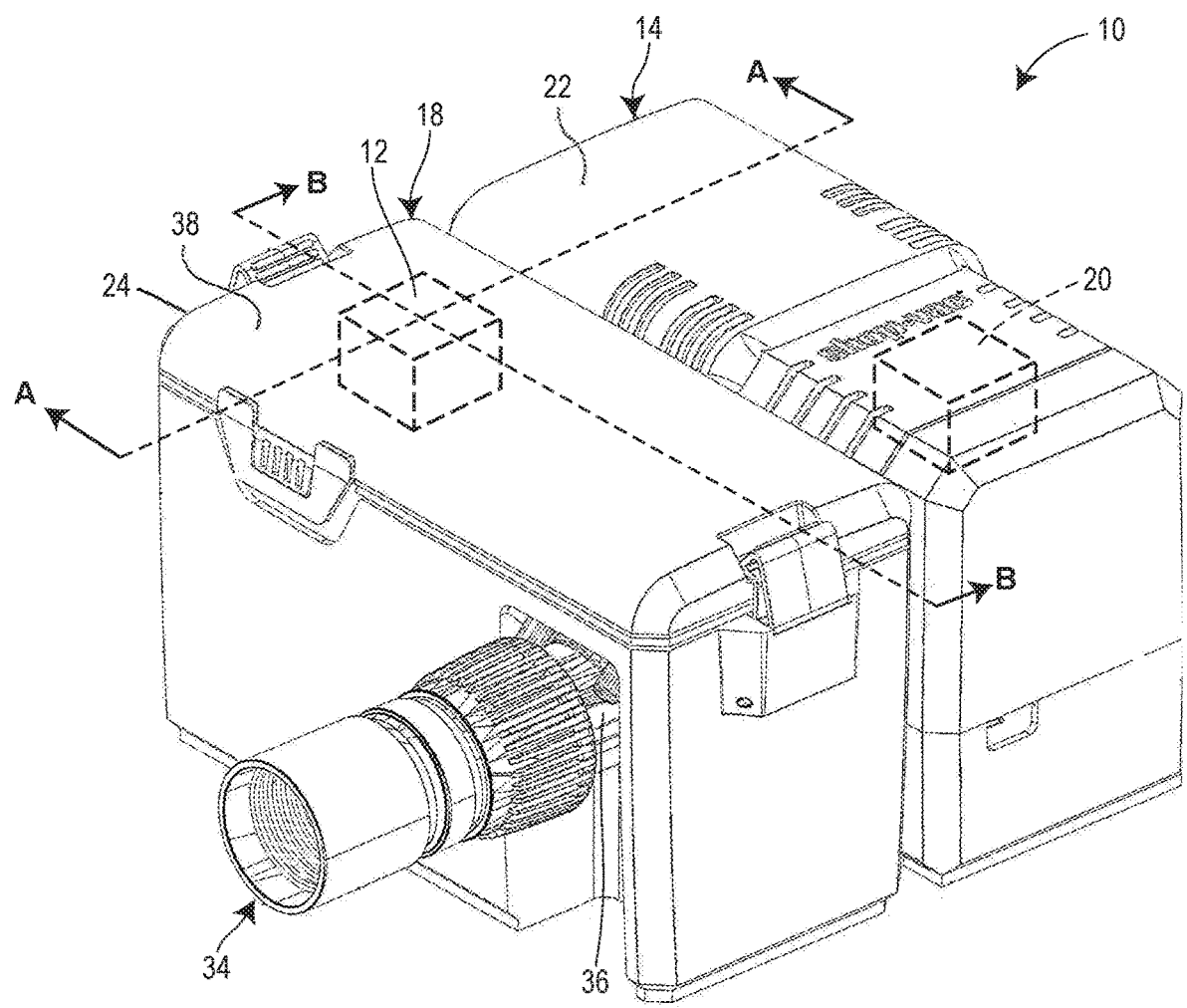
FIG. 1 is a top isometric view of an exemplary vacuum cleaner assembled in accordance with the principles of the present disclosure.
Figure 2:
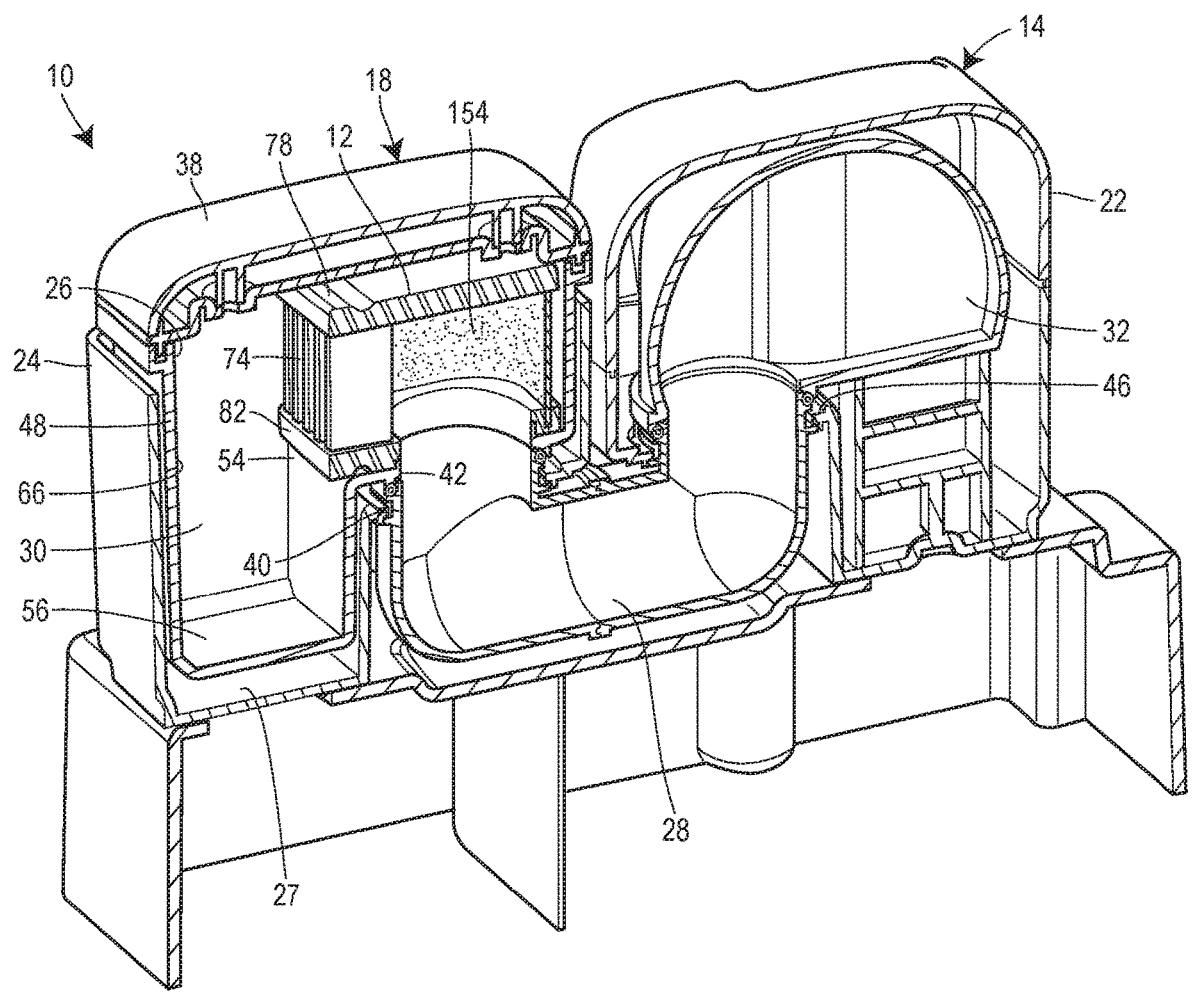
FIG. 2 is a cross-sectional view of the vacuum cleaner taken at A-A of FIG. 1, and showing the interior of a vacuum module and a collector module with a filter cartridge.
Figure 3:
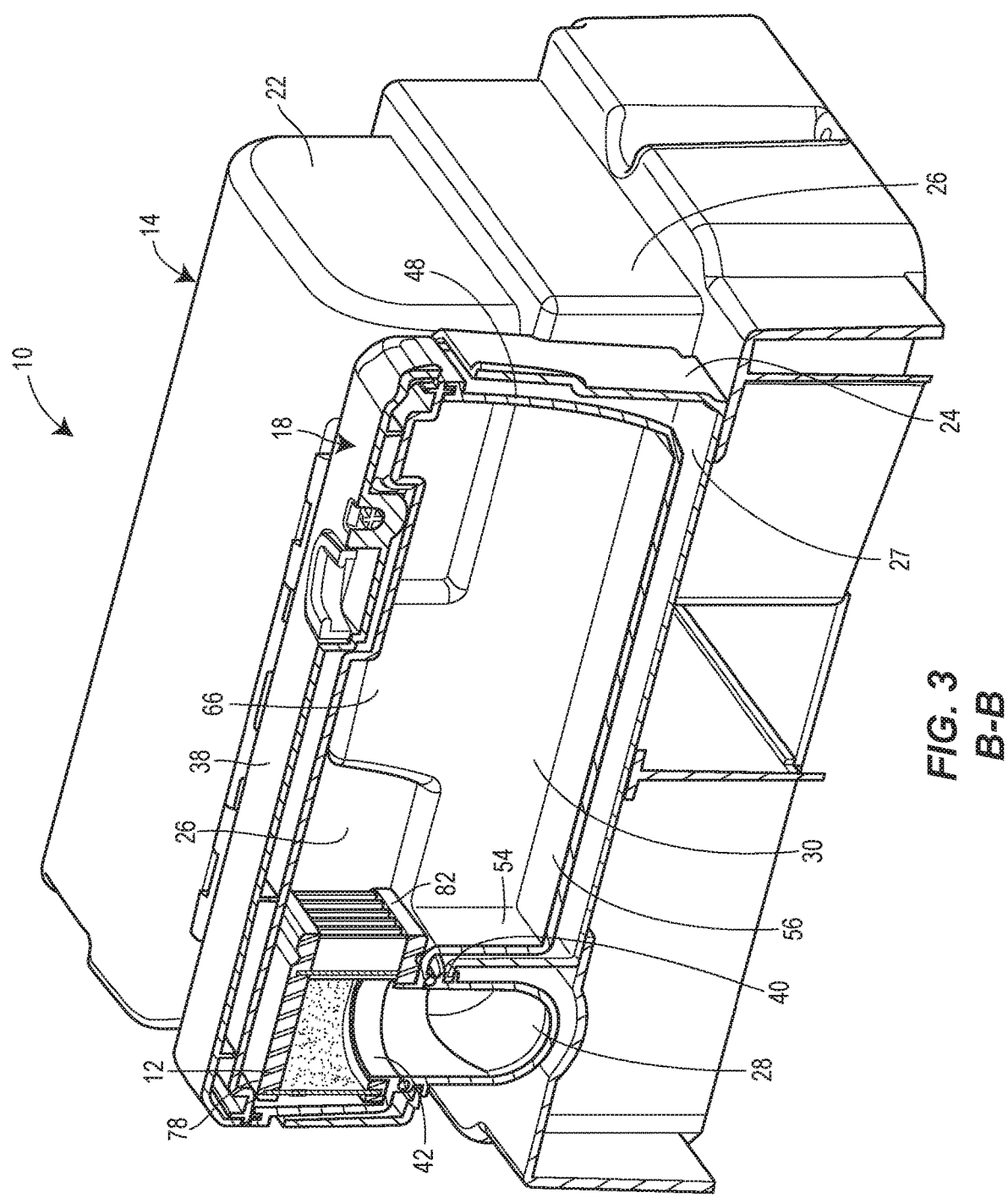
FIG. 3 is a cross-sectional view of the vacuum cleaner taken at B-B of FIG. 1.

FIGS. 1-3 illustrate an example vacuum cleaner 10 and a filter cartridge 12 constructed in accordance with the teachings of the present disclosure. The example vacuum cleaner 10 may be installed and operated within a vehicle (e.g., a car, truck, van, SUV, or other type of vehicle). For example, the vacuum cleaner 10 may be installed within a passenger compartment of the vehicle to provide easy access to clean the interior of the vehicle.

The exemplary vacuum cleaner 10 has a modular configuration and includes a vacuum module 14 and a collector module 18 connected in a side-by-side arrangement. The vacuum module 14 includes a motor/impeller unit 20 configured to draw a vacuum disposed in a motor housing 22. The collector module 18 includes a collector housing 24 and a debris canister 26 removably disposed within an interior compartment 27 of the collector housing 24. The collector module 18 is operatively connected to the vacuum module 14 via an interconnecting duct 28 to transport debris to the collector module 18 from air drawn by the vacuum module 14. In particular, the duct 28 fluidly connects an interior space 30 of the debris canister 26 to an interior compartment 32 of the motor housing 22. As shown in FIG. 1, a vacuum hose or wand may be connected to the collector housing 24 via a hose connector 34, which extends outwardly from an intake port 36 of the collector housing 24. In FIGS. 2 and 3, the interconnecting duct 28 extends between the vacuum module 14 and the debris canister 26 of the collector module 18. The debris canister 26 includes a hinged lid 38 that encloses the interior space 30 to facilitate disposal and containment of the debris collected in the canister 26. As illustrated, the collector module 18 is operatively connected to the vacuum module 14 in a side-by-side configuration. However, in other examples the vacuum module 14 and the collector module 18 may connect to each other in a number of different assembly arrangements (e.g., as an integrated unit). For example, multiple configurations of a modular vehicle vacuum cleaner are disclosed in PCT/US2017/042616, the disclosure of which is incorporated by reference herein.

The debris canister 26 couples to the collector housing 24 when the debris canister 26 is pushed into place within the interior compartment 27. As shown in FIGS. 2 and 3, the debris canister 26 is arranged to align an exhaust port 40 of the collector housing 24 with an outlet port 42 of the debris canister 26 when the debris canister 26 is coupled to the collector housing 24. The intake port 36 of the collector housing 24 is also aligned with an inlet port 44 of the debris canister 26 when the debris canister 26 and the collector housing 24 are coupled. It will be appreciated that one or more sealing components may be arranged between the debris canister 26 and the collector housing 24 such that the exhaust port 40 of the collector housing 24 is sealably connected with the outlet port 42 of the debris canister 26, and the intake port 36 of the collector housing 24 is sealably connected with the inlet port 44 of the debris canister 26. As such, when the debris canister 26 is aligned with and coupled to the collector housing 24, the interconnecting duct 28 extends between the outlet port 42 of the debris canister 26 and an inlet port 46 of the motor housing 22. In this arrangement, the filter cartridge 12 is disposed over the outlet port 42 and the interconnecting duct 28.

In operation, the vacuum module 14 provides a suction force so that a vacuum hose may collect debris from a target cleaning surface when operatively coupled to the collector module 18. The suction force pulls debris into the intake port 36 of the collector housing 24 and through the inlet port 44 of the debris canister 26 to deposit debris into the interior space 30 of the debris canister 26 of the collector module 18. The suction force pulls air through the filter cartridge 12 disposed in the interior space 30 and through the duct 28 connecting the outlet port 42 of the debris canister 26 and the inlet port 46 of the motor housing 22. In this way, any air that is pulled into the interior compartment 32 of the motor housing 22 is first filtered through the filter cartridge 12.

Figure 4:
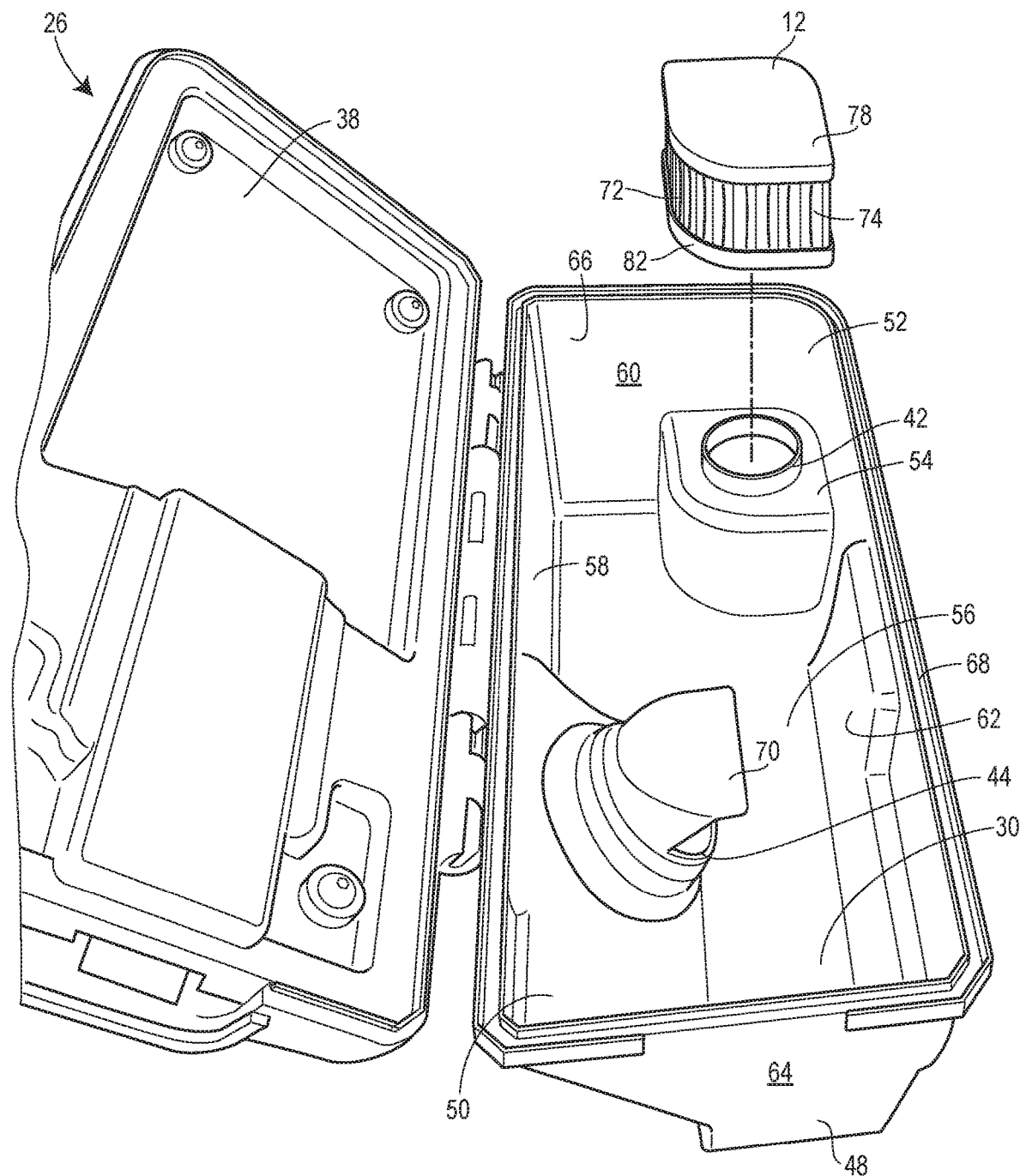
FIG. 4 is an exploded isometric view of a debris canister and a filter cartridge of FIG. 2, showing the debris canister in an open configuration.
Figure 5:
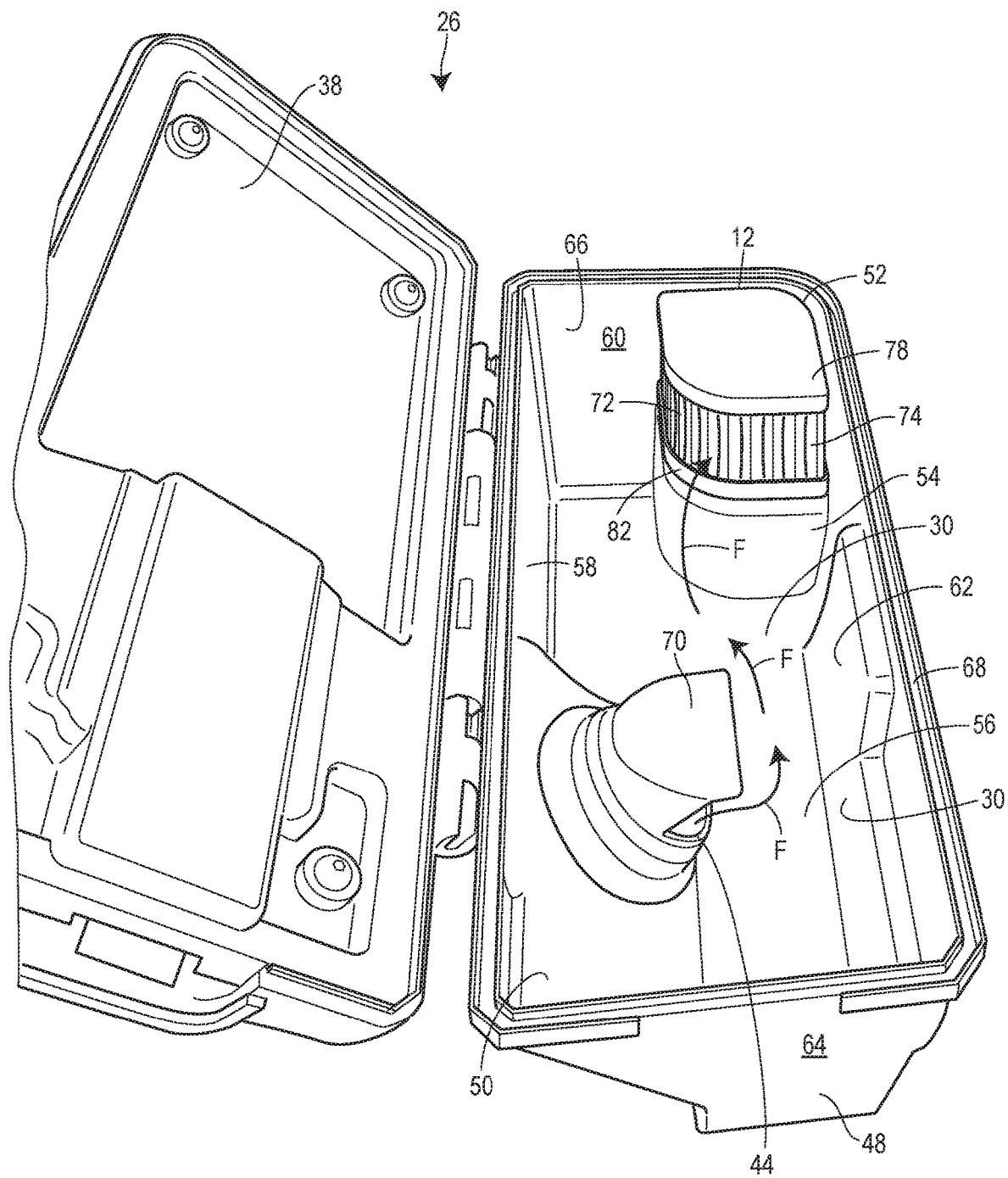
FIG. 5 is an isometric view of the debris canister and filter cartridge of FIG. 4, showing the filter cartridge coupled to the debris canister.
Figure 6:
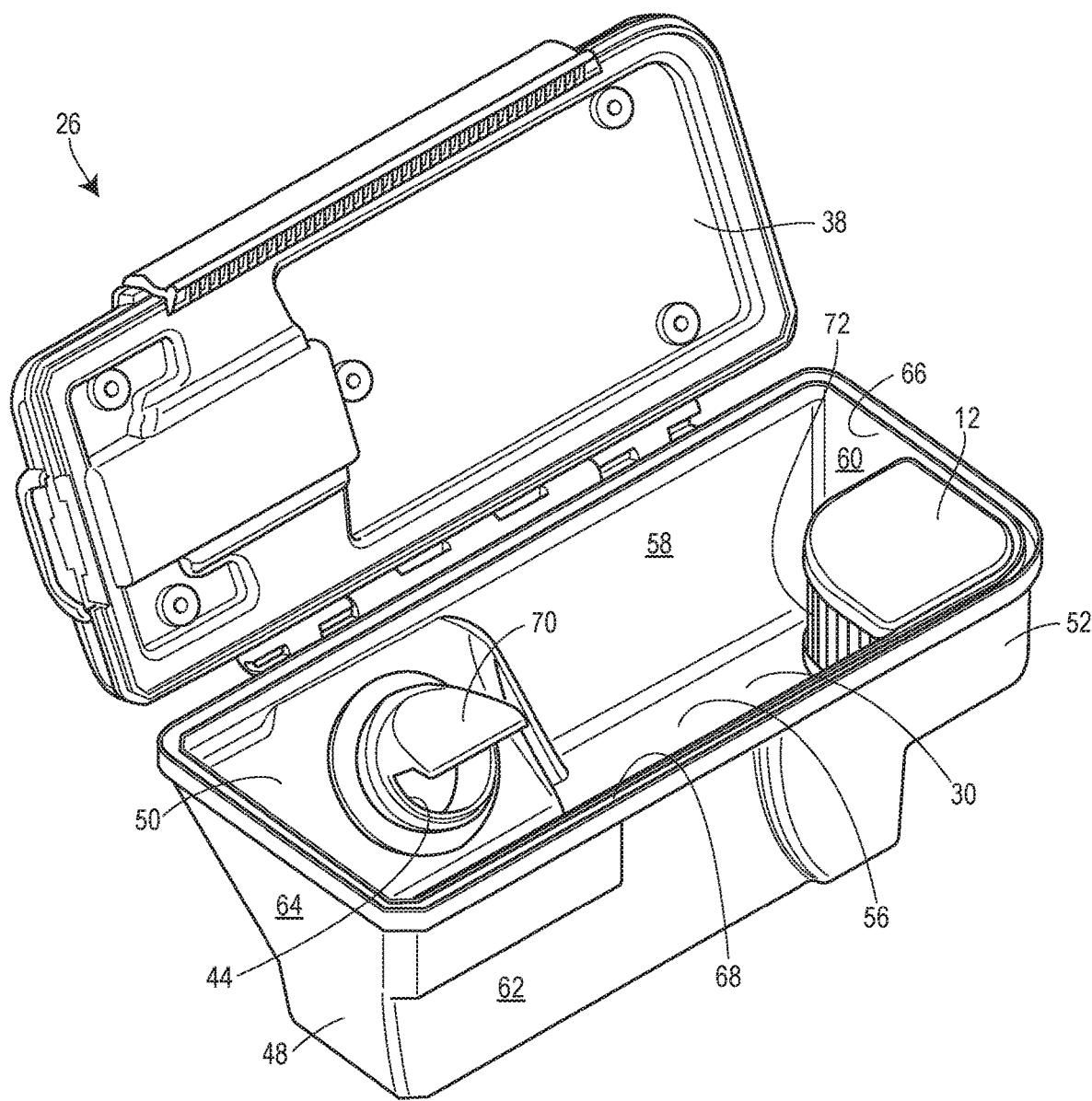
FIG. 6 is a different isometric view of the debris canister and filter cartridge of FIG. 5.
Figure 7:
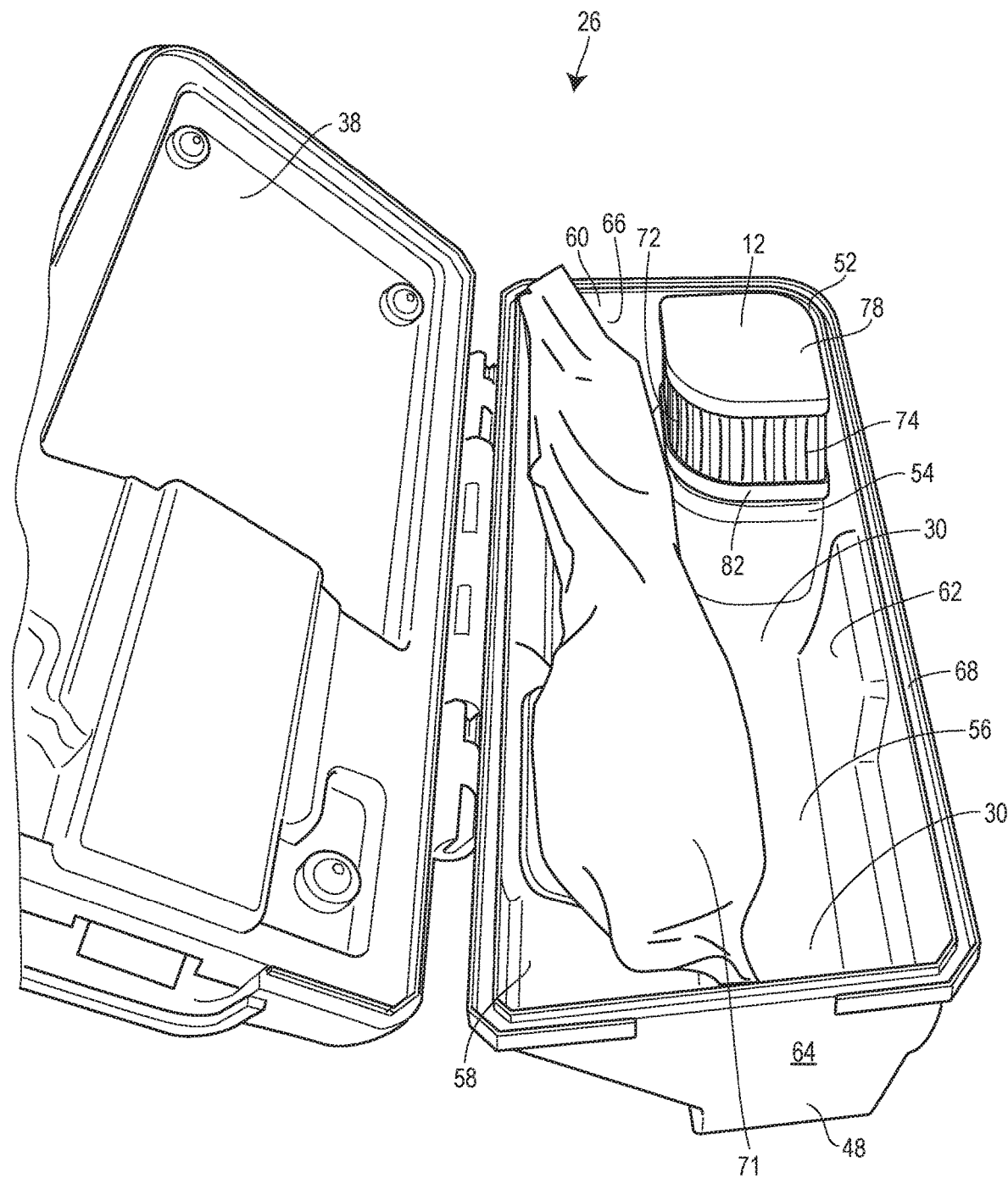
FIG. 7 is an isometric view of the debris canister and filter cartridge of FIG. 5, showing a filter bag coupled to the debris canister.

In FIGS. 4-6, the debris canister 26 of the vacuum cleaner 10 is shown isolated from the collector housing 24. The debris canister 26 includes the inlet port 44 defining the inlet, the outlet port 42 defining the outlet, and a peripheral side wall 48 at least partially defining the interior space 30 of the debris canister 26. As shown in FIG. 4, the inlet port 44 and the outlet port 42 of the debris canister 26 are formed in opposite first and second corner portions 50 and 52, respectively, of the peripheral side wall 48. In particular, the outlet port 42 is formed in a seat 54 protruding from a floor 56 of the peripheral side wall 48. The seat 54 is disposed in the corner portion 52 of the debris canister 26, and is shaped to accommodate the interconnecting duct 28 of the vacuum cleaner 10. The seat 54 provides a stable support surface that is sized to receive the filter cartridge 12. As shown in FIG. 4, the filter cartridge 12 is aligned with the outlet port 42 formed in the seat 54. The peripheral side wall 48 extends upwardly from an outer peripheral edge of the floor 56 to form a boxed enclosure with multiple sides 58, 60, 62, and 64. The peripheral sidewall 48 has an interior surface 66 that at least partially surrounds the interior space 30 of the debris canister 26. An upper edge 68 of the peripheral sidewall 48 defines an opening into the interior space 30, and the lid 38 seals with the upper edge 68 to cover the opening of the interior space 30 when the debris canister 26 is closed. As shown in FIGS. 4-6, an inlet fitting 70 is formed in the first side 58 of the peripheral wall 48, and is removably coupled to a filter bag 71, as shown in FIG. 7. In the illustrated example of FIG. 4, the seat 54 is integrally formed with the peripheral side wall 48 of the debris canister 26. However, in other examples, the seat 54 may be manufactured separately, and may be subsequently attached to the floor 56 of the debris canister 26 during assembly. In another example, the seat 54 may have a surface that is adapted to mate with a surface of the filter cartridge 12 to ensure alignment of the filter cartridge 12 with the outlet port 42 disposed in the seat 54.

As shown in FIG. 7, the filter bag 71 is coupled to the inlet port 44 of the debris canister 26, and is disposed within the interior space 30 to filter out debris from the air drawn into the debris canister 26 from the hose connector 34. The filter bag 71 is removably coupled to an inlet fitting 70, which surrounds the inlet port 44. The filter bag 71 provides a generally fluid tight seal with the fitting 70 at the inlet corner portion 50 of the debris canister 26. The lid 38 of the debris canister 26 can be selectively opened to provide access to the filter bag 71 within the interior space 30. The filter bag 71 may be disposable or reusable, and is made of a porous material that permits air to flow through the bag 71, while containing large debris and dirt particles within the volume of the bag 71. The filter bag 71 may be removed, discarded or emptied, and replaced by accessing the interior space 30 of the debris canister 26 when the lid 38 is open. In operation, when the motor/impeller unit 20 is turned on, air and debris is pulled through the hose connector 34 and inlet port 44 and into the filter bag 71 of the debris canister 26. The vacuum force continues to draw air through the filter bag 71, interior space 30 of the debris canister 26, and the filter cartridge 12 before passing through the outlet port 42. Any debris that passes through the filter bag 71 may be filtered by the filter cartridge 12 before the air exits the debris canister 26 and enters the vacuum module 14, thus providing an extra layer of filtering of the air. In this way, the air that is pulled into the motor/impeller unit 20 through the interconnecting duct 28 will be substantially free of dirt and debris, which could otherwise damage the impellers or other portions of the motor/impeller unit.

The debris canister 26 is preferably made of a durable plastic, such as polyethylene, that may be formed by injection molding, thermoforming, or compression molding, but may instead be formed of any other suitable and durable material including metal, fiberglass, or other similar materials, or any combination of these materials. The debris canister 26 can be injected molded such that the inlet port 44 and outlet port 42 are integrally formed with the peripheral side wall 48 of the canister 26. In other examples, the inlet port 44 and the outlet port 42 may be manufactured separately from the debris canister 26, and then subsequently attached to the peripheral wall 48 during assembly of the debris canister 26. Alternatively, the inlet port 44 and the outlet port 42 may be created after the debris canister 26 is formed.

The filter cartridge 12 includes a filter media 74, a top cap 78, and a fitting or bottom cap 82. When the filter cartridge 12 is coupled to the seat 54 of the debris canister 26, as shown in FIGS. 5-7, the filter cartridge 12 is adjacent to the peripheral side wall 48 of the debris canister 26 and the fitting 82 rests against the seat portion 54. The filter media 74 is shaped so that the filter cartridge 12 may fit closely to the interior surface 66 of the second and third sides 60, 62 of the peripheral wall 48. The filter cartridge 12 has a curved front side 72 that faces away from the corner portion 52 of the peripheral wall 48 and faces the interior space 30. The front side 72 is curved to maximize exposed surface area of the filter cartridge 12, and extends between perpendicular second and third sides 60 and 62 of the peripheral wall 48, which meet to form the corner portion 52. As will be described in more detail below, the filter cartridge 12 has a back side shaped to match the rounded corner portion 52 of the debris canister 26 for a tight fit within in the debris canister 26.

The cap 78 and the fitting 82 of the filter cartridge 12 are shaped to ensure that when an operator couples the filter cartridge 12 to the debris canister 26, the pleated portion 84 is disposed within a primary flow path F of the canister 26 (FIG. 5), and the non-pleated portion 88 is disposed adjacent to the interior surface 66 of the debris canister 26. This particular arrangement and placement of the filter media 74 maximizes the exposed surface area of the filter media 74 and minimizes the occupied space of the filter cartridge 12 within the debris canister 26. The larger surface area of the pleated portion 84 is disposed within a vacuum air flow path F, which is defined between the inlet port 44 and the outlet port 42 of the debris canister 26. The non-pleated portion 88 is not directly disposed in the primary air flow path F, and is instead positioned adjacent the interior surface 66 of the corner portion 52 of the peripheral side wall 48 of the debris canister 26 where there is less airflow. To minimize occupied space, the non-pleated portion 88 has a reduced thickness and therefore smaller surface area so that the back side 90 of the filter cartridge 12 can be closer to the peripheral side wall 48.

Figure 8:
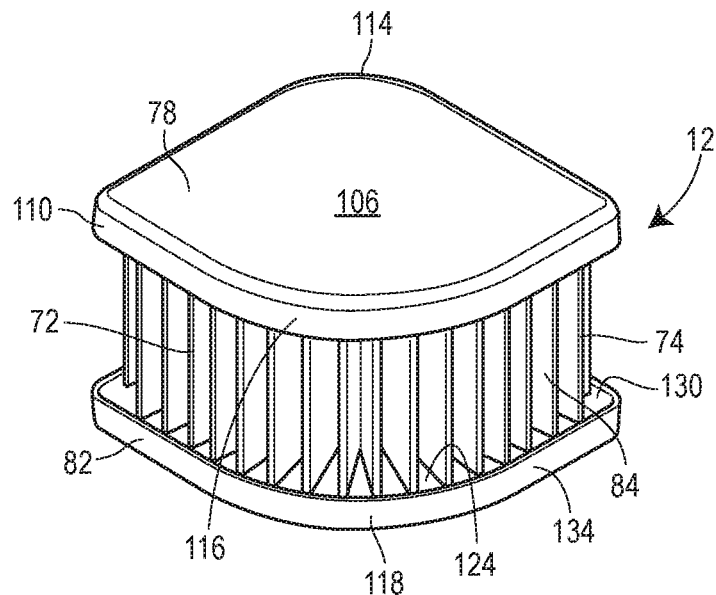
FIG. 8 is a top isometric view of a front side of the filter cartridge of FIG. 2 assembled in accordance with the principles of the present disclosure, and showing a pleated portion of the filter cartridge.
Figure 9:
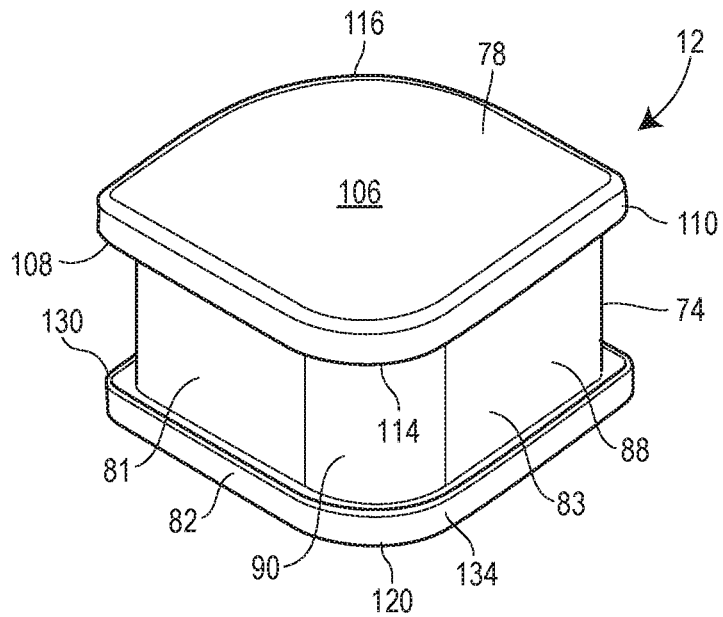
FIG. 9 is a top isometric view of a back side of the filter cartridge of FIG. 8, showing a non-pleated portion of the filter cartridge.

Turning to FIGS. 8 and 9, the filter media 74 is an enclosed filter loop and includes a pleated portion 84 and a non-pleated portion 88. In the illustrated example, the pleated portion 84 is disposed on the front side 72 of the filter cartridge 12, as shown in FIG. 8, and the non-pleated portion 84 is disposed on a back side 90 of the filter cartridge 12. The back side 90 is shaped to face the interior surface 66 of the peripheral wall 48 when the filter cartridge 12 is coupled to the debris canister 26 (FIGS. 4-7). The back side 90 may be shaped to fit within a particular angle of the corner portion 52 of the peripheral side wall 48. In the illustrated example, the perpendicular sides 60 and 62 of the side wall 48 meet at substantially a 90 degree angle. Thus, the back side 90 of the filter cartridge 12 has a first side 81 and a second side 83 (see FIG. 9) that meet to form a corner with an angle of substantially 90 degrees or less. However, in other examples, the debris canister 26 may have a smaller or larger angled corner 52, and the back side 90 of the filter cartridge 12 may correspond to fit against the corner 52 of the debris canister 26. In one example, the back side 90 may be constructed accordingly to form an angle in a range of approximately 45 degrees to approximately 180 degrees.

The filter media 74 defines the middle or central portion of the filter cartridge 12, and may be one material that forms both the pleated portion 84 and the non-pleated portion 88. The filter media 74 may be made of a first material and a second material that is different than the first material. In this example, the pleated portion 84 may be formed from the first material and the non-pleated portion 88 may be formed from the second material. The second material forming the non-pleated portion 88 may have the same or better filtration capabilities as the first material forming the pleated portion 84. The different materials may be attached (e.g., welded, glued, connected, interwoven, etc.) to form the enclosed filter loop.

Figure 10:
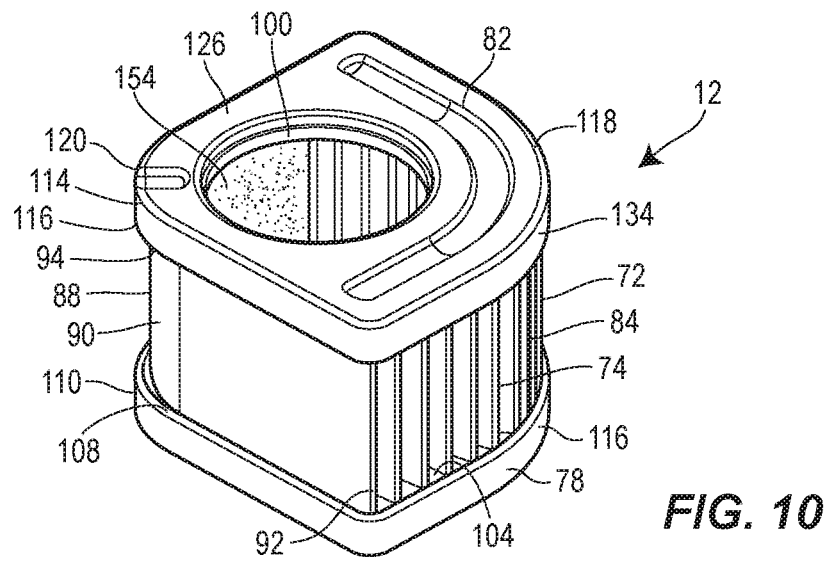
FIG. 10 is a bottom side isometric view of a side of the filter cartridge of FIG. 8, showing both the pleated and non-pleated portions of the filter cartridge.
Figure 11:
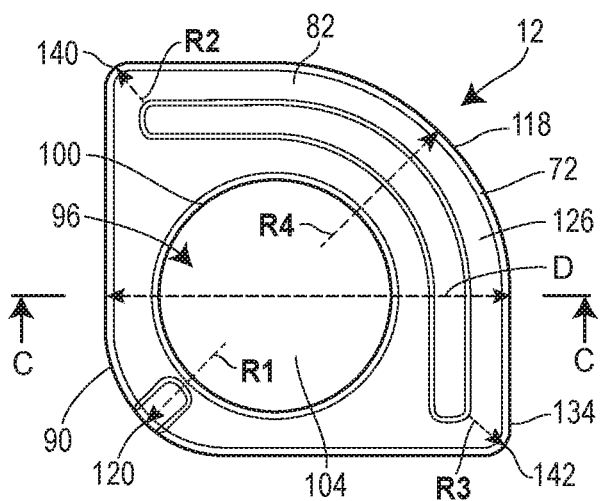
FIG. 11 is a bottom view of the filter cartridge of FIG. 8.
Figure 12:
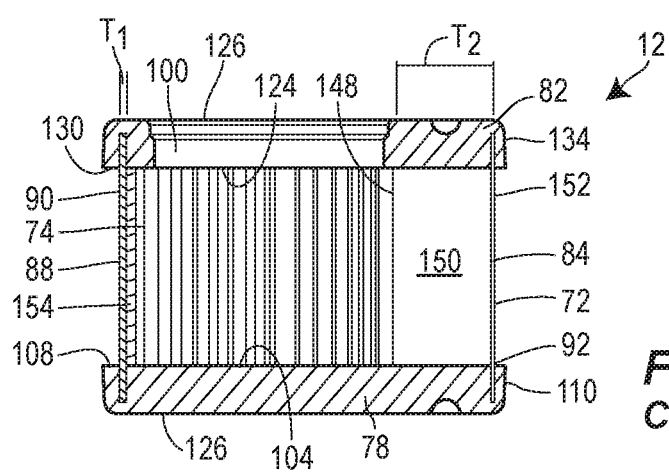
FIG. 12 is a cross-sectional view of the filter cartridge of FIG. 8 taken at C-C of FIG. 11.

In FIGS. 10-12, the filter media 74 includes a first end 92, a second end 94, and cavity 96 is at least partially defined (i.e., surrounds) by the filter media 74. The cavity 96 is configured to fluidly couple to an opening of the outlet port 42 when the filter cartridge 12 is attached to the debris canister 26. The cavity 96 defined by the filter media 74 is closed at a first end 92 by the cap 78 and partially closed at the second end 94 by the fitting 82. The cap 78 and the fitting 82 may be coupled to the filter media 74 in such a way that would facilitate replacing the filter media 74 at the end of its useful life. As such, the cap 78 is coupled to the first end 92 of the filter media 74 and the fitting 82 is coupled to the second end 94 of the filter media 74. When the filter cartridge 12 is placed over the outlet port 42 of the debris canister 26, the second end 94 of the filter media 74 and the fitting 82 are adjacent to the outlet port 42.

The cap 78 and the fitting 82 match the outer peripheral shape of the filter media 74. The cap 78 is coupled to the first end 92 of the filter media 74 opposite the fitting 82. The cap 78 has an interior side 104 directly adjacent to the first end 92 of the filter media 74, and an exterior side 106 facing away from the filter media 74. The cap 78 includes an upper lip 108 that hangs slightly beyond an outer perimeter of the filter media 74. An outer edge 110 of the cap 78 may help contain the filter media 74 within the filter cartridge 12, and may be configured to directly engage the interior surface 66 of the peripheral side wall 48. The outer edge 110 of the cap 78 is shaped to match the irregular shape of the filter media 74, and fits within the corner portion 52 of the debris canister 26. The outer edge 110 includes a rounded corner portion 114 and a curved portion 116 that substantially match the general outer perimeter of the non-pleated portion 88 and pleated portion 84 of the filter media 74, respectively.

The fitting 82 is similarly shaped with a curved portion 118 aligned with the front side 72 of the filter cartridge 12, and a rounded corner portion 120 aligned with the back side 90 of the filter cartridge 12. The fitting 82 is coupled to the second end 94 of the filter media 74. The fitting 82 has an interior side 124 adjacent to the second end 94 of the filter media 74, and an exterior side 126 arranged to abut the seat 54 of the debris canister 26. The fitting 82 has a bottom lip 130 that slightly extends beyond the outer perimeter of the filter media 74. An outer edge 134 of the fitting 82 may help contain the filter media 74 within the filter cartridge 12, and may be configured to directly engage the interior surface 66 of the peripheral side wall 48.

In FIGS. 10-12, the fitting 82 defines a central aperture 100 that is sized to align with and receive the outlet port 42 of the debris canister 26. The aperture 100 of the fitting 82 traverses through the interior side 124 and the exterior side 126 of the fitting 82, and is sized to receive and at least partially surround the outlet port 42 of the debris canister 26. The outlet port 42 is disposed within the aperture 100 of the fitting 82 so that the filter cartridge 12 surrounds the outlet port 42 when the filter cartridge 12 is coupled to the debris canister 26 (FIG. 2). When the filter cartridge 12 is installed within the debris canister 26, the fitting 82 of the filter cartridge 12 forms a fluid-tight seal with the outlet port 42 via one or more seals. The fluid tight seal may be formed between the outlet port 42 and the fitting 82, the fitting 82 and the seat 54, or a seal may be formed at both locations. The filter cartridge 12 may be secured to the debris canister 26 by a threaded connection, by snap-fitting, by interference fitting, or by friction-fitting. In this case, the aperture 100 of the fitting 82 is sized according to an outer perimeter of the outlet port 42 so that the fitting 82 and the outlet port 42 may be attached by interference fit. The filter cartridge 12 may be uncoupled from the outlet port 42 by pulling the filter cartridge 12 away from the debris canister 26. The fitting 82 and the cap 78 may be configured to match the contoured interior surface 66 of the peripheral wall 48 when the filter cartridge 12 is secured to the seat 54 to ensure both proper alignment of the outlet port 42 and arrangement of the filter media 74 relative to the interior space 30 of the debris canister 26. Other arrangements for securing the filter cartridge 12 to the debris canister 26 while providing a fluid-tight seal are possible, and in some examples, the filter cartridge 12 may be permanently secured over the outlet port 42.

Figure 13:
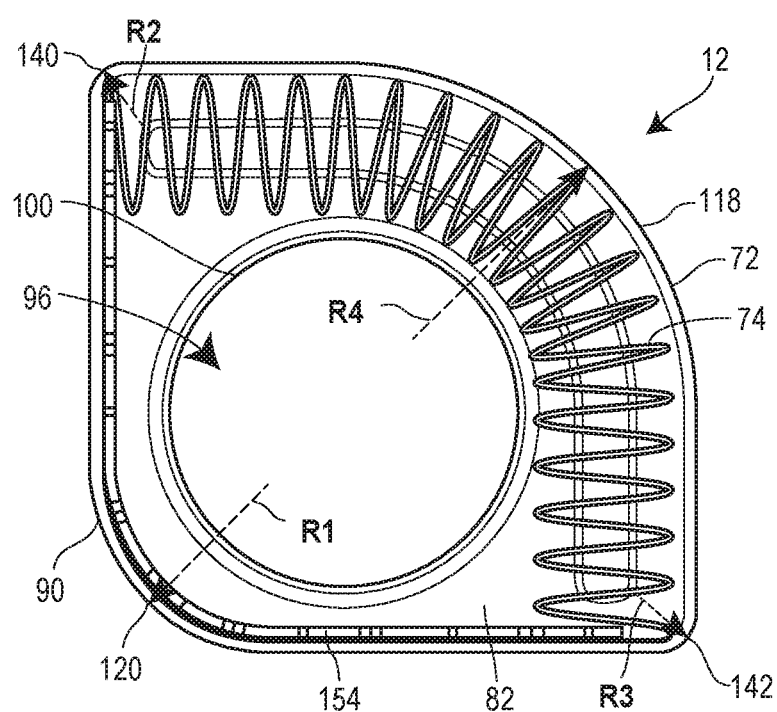
FIG. 13 is a top view of the filter cartridge of FIG. 11 showing the cap removed.

As shown in FIGS. 11 and 13, the outer edge 134 of the fitting 82 defines the outer perimeter and includes a first corner (defined by the rounded corner portion 120), a second corner 140, a third corner 142, and a fourth corner (defined in part by the curved portion 118). The outer edge 134 is shaped so that the corner portion 120 is different than the curved portion 118. Similarly, the pleated portion 84 of the filter media 74, which follows the shape of the curved portion 118 of the fitting 82 has a different geometry than the non-pleated portion 88 of the filter media 74. For example, the outer edge 134 defines the first corner 120 with a first radius of curvature R1, the second corner 140 with a second radius of curvature R2, and the third corner 142 with a third radius of curvature R3. The second and third radii of curvature R2 and R3 of the illustrated example are substantially equal, however in other examples the second and third radii R2 and R3 of curvature may be different. The first radius of curvature R1 is greater than the second and third radii of curvature R2 and R3, thus forming the rounded corner shape 120 to fit within the corner portion 52 of the debris canister 26. The fourth corner 118 has a fourth radius of curvature R4 that is greater than the first radius of curvature R1. In this example, the first radius of curvature R1 is different than each of the second, third, and fourth radii of curvature R2, R3, and R4, and the first radius of curvature R1 is less than the fourth radius of curvature R4. For example, a ratio R1:R2 of the first radius of curvature R1 to the second radius of curvature R2 may be approximately 1:2 or 1:2.5. However, in other examples, the outer edge 134 may define each corner differently depending upon the particular arrangement desired for the filter cartridge 12. For example, the fourth radius of curvature R4 may be less than or substantially equal to the first radius of curvature R1. In yet another example, the fourth radius of curvature R4 may be substantially equal to the second and third radii of curvature R2 and R3. In the illustrated example, the pleated portion 84 of the filter media 74 extends along an outer edge of the filter media 74 between the second corner 140 and the fourth corner 118, and between the fourth corner 118 and the third corner 142. The non-pleated portion 88 extends along the outer edge of the filter media 74 between the second corner 140 and the first corner 120 and between the first corner 120 and the third corner 142. However, in another example, the outer edge 134 of the fitting 82 may not define a fourth corner, and as such, the pleated portion 84 may extend from the second corner 140 to the third corner 142. It will be appreciated that the outer edge 110 of the cap 78 is parallel to the outer edge 134 of the fitting 82 such that the radii of curvature of the cap 78 may be identical to the radii of curvature of the fitting 82.

As discussed previously, the filter media 74 is composed of non-pleated 88 and pleated 84 portions. The pleated portion 84 of the filter media 74 may have uniform folds (i.e., the folds are the same size) extending around the curve of the front side 72 of the filter cartridge 12. As illustrated in FIGS. 9-11, the filter media 74 is folded into multiple pleats and formed into a partially-cylindrical shape where the pleated portion 84 has a round and "rippled" or "pleated" appearance, and the non-pleated portion 88 has a rounded corner shape formed by the first side and the second side. The non-pleated portion 88 is adjacent the peripheral wall 48 because the non-pleated portion 88 has less surface area than the surface area of the pleated portion 84, and therefore the non-pleated portion 88 advantageously occupies less space within the interior space 30 of the debris canister 26. In the example shown in FIG. 12, the non-pleated portion 88 has a thickness T1 which is substantially the same measurement as the thickness of the filter media material. As such, the non-pleated portion 88 occupies less space within the debris canister 26 than the pleated portion 84, and the non-pleated portion 88 permits the cartridge 12 to sit closer to the peripheral side wall 48. A thickness T2 of the pleated portion 84 is measured from an innermost point 148 of one fold 150 or pleat of the multiple pleats to an outermost point 152 of the same fold 150, as shown in FIG. 12. The pleated portion 84 is adjacent the interior space 30 such that the pleats of the filter media 74 are in contact with, or exposed to, the airstream F during vacuum operation (FIG. 5). In other embodiments, the pleated portion 84 may have non-uniform folds such that the pleats change in size around the curve of the front side 72 of the filter media 74. For example, the pleated portion 84 may include very small folds at either end of the curved front side 72 until the filter media 74 gradually flattens into the non-pleated portion 88 of the back side 90.

The filter cartridge 12 may include an interior layer 154 for additional structural support for the filter media 74. For example, as shown in FIGS. 10 and 12, the interior layer 154 is illustrated adjacent to the non-pleated portion 88 within the cavity 96 of the filter cartridge 12. The interior layer 154 is preferable a rigid and porous material, such as a metal mesh, and may extend partially around or completely around the entire length of the back side 90 of the filter media 74. The interior layer 154 may be porous to allow air flow through the non-pleated portion 88 of the filter media 74, and may be metal, woven fiber, plastic, or other suitable material. Alternatively, the interior layer 154 may be a non-porous material. The interior layer 154 is constructed to bear the weight of the cap 78 when the filter cartridge 12 is assembled.

Further, the interior layer 154 may be used to help shape the non-pleated portion 88 during manufacturing of the filter cartridge 12. For example, the interior layer 154 may be sufficiently rigid to help form and shape initially pleated filter media material into the non-pleated portion 88. In one example method, a portion of a continuous piece of pleated filter media 74 is stretched over the interior layer 154 until the pleats or folds of the filter media 74 are flattened. After the non-pleated portion 88 is formed, the filter media 74 may then be secured to the interior layer 154 to hold the shape of the filter media 74 and keep the non-pleated portion 88 flat against the interior layer 154. The interior layer 154 may be shaped to hold the non-pleated portion 88 to match the corner portion 52. In other words, the filter media 74 (initially pleated) may be wrapped around the interior layer 154, which acts as a frame for the filter media 74, to form the non-pleated portion 88 and mold the non-pleated portion 88 into the shape of the back side 90. The remainder of the filter media 74 may be molded or shaped so that the pleated portion 84 forms the curved shape of the front side 72 of the filter media 74. In another example method, filter media 74 is formed by combining two different materials. The non-pleated portion 88 may be a different material than the pleated portion 84 and is attached to the pleated portion 84 by suitable means. The different material of the non-pleated portion 88 may have a porosity that is equal to or greater than a porosity of the material of the pleated portion 84. In other words, the different material may have the same filtration capability or better filtration capability as the pleated filter media 74. In another example, the different material may be non-porous.

Once the filter media 74 is shaped, the cap 78 and the fitting 82 are attached to the first and second ends 92, 94 of the filter media 74, respectively, to create an assembled filter cartridge unit 12. The second end 94 of the filter media 74 may be fixed (e.g., glued, welded, or clamped) to the interior side 124 of the fitting 82 after the filter media 74 is arranged in the desired shape. The cap 78 may be fixed (e.g., glued, welded, or clamped) to the top end 92 of the filter media 74 to enclose the filter media 74. In another embodiment, the filter cartridge 12 may be assembled by first attaching the cap 78 to the first end 92 of the filter media 74 before the fitting 82 is attached to the second end 94. In yet another embodiment, the porous inner layer 154 may be removed once the filter media 74 is secured to either the fitting 82 or the cap 78. In another example, the filter cartridge 12 may be constructed without the porous inner layer 154, and may incorporate a different support structure.

In other embodiments, the filter cartridge 12 may not include the inner interior layer 154. Instead, the non-pleated portion 88 may be shaped by flattening, heat treating, stretching, or shaping the filter media 74 by other suitable methods so that the non-pleated portion 88 deforms and holds its shape. In yet another example, the filter media 74 may not be arranged from a continuous piece of pleated filter media, and may instead be composed of two separate pieces of filter media 74 arranged to form the closed filter loop. The filter media 74 may be made of a stiff, porous material such that the filter media 74 may be malleable and maintain its shape easily without requiring the inner interior layer 154. The non-pleated portion 88 may be non-porous.

The filter media may be made of any number of suitable filtration materials, such as, for example, cloth, glass-fiber materials, split-fiber materials, solution-spun fibers and materials made from such fibers, felt materials, natural fiber filter material, expanded polytetrafluoroethylene (PTFE) membranes, expanded ultra-high molecular weight polyethylene (PE) membranes and materials, melt-blown media, such as melt-blown polypropylene (PP) or melt-blown polyethylene (PE), microporous open cell polymers, such as polyurethane foam, poly(ethylene terephthalate), (PET) or polyphenylene sulfide (PPS) based materials, as well as copolymer-based materials thereof, high-efficiency particulate air (HEPA), triboelectrified media and materials.

The filter cartridge 12 of the present disclosure advantageously provides a compact design and irregular shape to fit against the peripheral wall 48 of the debris canister 26 while also maximizing filter capacity. In this particular example, the filter cartridge 12 is shaped to fit within the corner portion 52 of the debris canister 26 and sit closely to the interior surface 66 of the peripheral wall 48. The configuration of the filter cartridge 12 facilitates removing and replacing the filter cartridge 12 from the debris canister 26 so that an operator may easily align the filter cartridge 12 to cover the outlet port 42 formed in the peripheral wall 48. The vacuum cleaner 10 of FIGS. 1-3 is one example of a vacuum cleaner that may incorporate a debris canister 26 and the compact filter cartridge 12 as illustrated in FIGS. 4-7. However, other configurations of vacuum cleaners, including vacuum cleaners that are not specifically for installation within a vehicle, may incorporate the debris canister 26 and/or the filter cartridge 12, which is shown in FIGS. 8-12. This particular arrangement and placement of the filter media 74 maximizes the exposed surface area of the filter media 74 and minimizes the occupied space of the filter cartridge 12 within the debris canister 26. The cap 78 and the fitting 82 may be coupled to the filter media 74 in such a way that would facilitate replacing the filter media 74 at the end of its useful life.

The figures and description provided herein depict and describe preferred embodiments of a compact filter cartridge and a vacuum cleaner including such a filter cartridge for purposes of illustration only. One skilled in the art will readily recognize from the foregoing discussion that alternative embodiments of the components illustrated herein may be employed without departing from the principles described herein. Thus, upon reading this disclosure, those of skill in the art will appreciate still additional alternative structural and functional designs for filter cartridges for a vehicular vacuum cleaner. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. A canister and filter assembly for a vacuum cleaner, the assembly comprising:
 a canister having an inlet port, an outlet port, and a peripheral side wall, the peripheral side wall at least partially defining an interior space of the canister; and
 a filter disposed in the interior space of the canister and adjacent the outlet port, the filter including a filter media having a non-pleated portion and a pleated portion;
 wherein the peripheral side wall forms a corner and the filter media defines a corner separate from the corner of the peripheral side wall, the corner of the filter media is shaped to fit adjacent to the corner of the peripheral side wall, and the non-pleated portion is shaped to fit within the corner of the peripheral side wall of the canister.

2. The assembly of claim 1, wherein the pleated portion of the filter media has a first surface area and the non-pleated portion of the filter media has a second surface area, the first surface area greater than the second surface area.

3. The assembly of claim 1, further comprising an interior layer of material disposed adjacent to the non-pleated portion of the filter media.

4. The assembly of claim 1, wherein the outlet of the canister is disposed adjacent the corner of the peripheral side wall.

5. The assembly of claim 1, wherein the non-pleated portion of the filter media is disposed adjacent to an interior surface of the corner of the peripheral side wall.

6. The assembly of claim 1, wherein the filter is disposed adjacent to the corner of the peripheral side wall, the filter at least partially surrounding the outlet.

7. The assembly of claim 1, wherein the filter further comprises a cap coupled to a first end of the filter media and a fitting coupled to a second end of the filter media, the first end opposite the second end.

8. The assembly of claim 7, wherein the fitting is removably coupled to the debris canister, the fitting at least partially surrounding the outlet when the fitting is coupled to the debris canister.

9. The assembly of claim 1, wherein the filter media includes an outer perimeter and the pleated portion forms a curve in the outer perimeter.

10. The assembly of claim 1, wherein the filter media comprises a first material and a second material different from the first material, the pleated portion being the first material and the non-pleated portion being the second material.

11. The assembly of claim 10, wherein the first material has a first porosity and the second material has a second porosity, the second porosity greater than the first porosity.

12. A canister and filter assembly for a vacuum cleaner, the assembly comprising:
a canister having an inlet port, an outlet port, and a side wall at least partially defining an interior space;
a filter disposed in the interior space of the canister, the filter including a filter media including a pleated portion and a non-pleated portion; and
an interior layer of material disposed adjacent to the non-pleated portion.

13. The assembly of claim 12, wherein the non-pleated portion of the filter is a material different from a material of the pleated portion.

14. The assembly of claim 12, wherein the non-pleated portion is stretched over the interior layer of material.

15. The assembly of claim 12, wherein the non-pleated portion of the filter media is disposed adjacent to an interior surface of the side wall of the canister.

16. The assembly of claim 12, wherein the pleated portion of the filter media has a first thickness and the non-pleated portion of the filter media has a second thickness, the first thickness being greater than the second thickness.

17. The assembly of claim 12, wherein the side wall of the canister forms a corner, the outlet of the canister proximally located to the corner of the canister.

18. The assembly of claim 17, wherein the non-pleated portion of the filter media is adjacent to the corner of the canister.

19. The assembly of claim 12, wherein the filter media includes an exterior surface and an interior surface, and wherein the non-pleated portion of the exterior surface faces the side wall, and the pleated portion of the exterior surface faces the interior space of the canister.

20. The assembly of claim 19, wherein the filter media defines an enclosed loop having a first end, a second end opposite the first end, and a cavity extending between the first end and the second end.

21. The assembly of claim 20, further comprising:
a cap coupled to the first end of the filter media; and
a fitting coupled to the second end of the filter media, the fitting including an aperture sized to receive the outlet port.

22. The assembly of claim 21, wherein the fitting at least partially surrounds the outlet when the fitting is coupled to the canister.

23. A filter cartridge for a vacuum cleaner, the filter cartridge comprising:
a filter media including a non-pleated portion and a pleated portion, and
a cavity at least partially defined by the filter media;
wherein the non-pleated portion has a first side and a second side that meet to form a corner, the corner having an angle in a range of approximately 45 degrees to approximately 180 degrees between the first side and the second side of the non-pleated portion.

24. The filter cartridge of claim 23, further comprising an interior layer disposed on the non-pleated portion of the filter media.

25. The filter cartridge of claim 24, wherein the interior layer is metal.

26. The filter cartridge of claim 24, wherein the interior layer is plastic.

27. The filter cartridge of claim 23, wherein the pleated portion has a round shape and is connected to the non-pleated portion to form a closed loop.

28. The filter cartridge of claim 23, further comprising a cap coupled to a first end of the filter media, and a fitting coupled to a second end of the filter media.

29. The filter cartridge of claim 28, wherein the fitting includes an aperture positioned aligned with the cavity defined by the filter media.

30. The filter cartridge of claim 23, wherein the pleated portion of the filter media is a first material and the non-pleated portion of the filter media is a second material different from the first material.

31. The filter cartridge of claim 30, wherein a porosity of the first material is less than a porosity of the second material.

32. A vacuum cleaner for mounting a vehicle, the vacuum cleaner comprising:
a vacuum module including a motor housing and a motor disposed in the motor housing, the vacuum module configured to draw a vacuum;
a connecting duct operatively coupled to the motor housing;
a collector module operatively coupled to the vacuum module via the connecting duct, the collector module including a collector housing and a debris canister removably disposed in the collector housing, the debris canister further comprising:
an inlet port;
an outlet port; and
a peripheral side wall having an interior surface, the interior surface at least partially defining an interior space of the debris canister;
a filter cartridge disposed in the interior space of the debris canister, the filter cartridge including a filter media having a pleated portion and a non-pleated portion;
wherein the collector module is configured to collect debris from air drawn by the vacuum module.

33. The vacuum cleaner of claim 32, wherein the filter media includes a first end and a second end, and the filter cartridge includes a cavity partially defined by the first end and the second end, the cavity of the filter cartridge in fluid communication with the interconnecting duct.

34. The vacuum cleaner of claim 33, further comprising a cap coupled to the first end of the filter media and a fitting coupled to the second end of the filter media, the fitting including an aperture sized to couple to the outlet port of the debris canister.

35. The vacuum cleaner of claim 32, wherein the side wall of the debris canister at least partially forms a corner proximally located to the outlet of the debris canister.

36. The vacuum cleaner of claim 35, wherein the non-pleated portion of the filter media is adjacent to the corner of the side wall.

37. The vacuum cleaner of claim 35, wherein the filter cartridge is disposed adjacent to the corner formed by the side wall, the filter cartridge at least partially surrounding the outlet of the debris canister.

38. The vacuum cleaner of claim 32, wherein the pleated portion of the filter media has a thickness and the non-pleated portion of the filter media has a different thickness, wherein the thickness of the non-pleated portion is greater than the thickness of the pleated portion.

39. The vacuum cleaner of claim 32, wherein the non-pleated portion of the filter media is disposed adjacent to the interior surface of the side wall of the debris canister.

40. A filter cartridge for a vacuum cleaner, the filter cartridge comprising:
- a filter forming a closed loop, the closed loop including an outer edge and;
- a cap coupled to the filter and including an outer edge comprising:
  - a first corner having a first radius of curvature;
  - a second corner having a second radius of curvature; and
  - a third corner having a third radius of curvature;
  - wherein the second radius of curvature is substantially equal to the third radius of curvature, and wherein the first radius of curvature is greater than the second radius of curvature and the third radius of curvature.

41. The filter cartridge of claim 40, wherein the cap extends radially outward from the outer edge of the filter.

42. The filter cartridge of claim 40, further comprising a second cap coupled to a second end of the filter, wherein the second cap includes an outer perimeter substantially aligned with the outer perimeter of the cap.

43. The filter cartridge of claim 40, wherein the outer perimeter of the cap further comprises a fourth corner having a fourth radius of curvature, wherein the fourth radius of curvature is greater than the first radius of curvature.

44. The filter cartridge of claim 40, wherein a ratio between the fourth radius of curvature and the first radius of curvature is approximately 2 to 1.

45. The filter cartridge of claim 40, wherein the filter includes a pleated portion extending along the outer edge of the filter between the second corner and the fourth corner of the cap and between the fourth corner and the third corner of the cap.

46. The filter cartridge of claim 40, wherein the filter includes a non-pleated portion extending along the outer edge of the filter between the first corner and the second corner of the cap.

* * * * *